Figure 1:
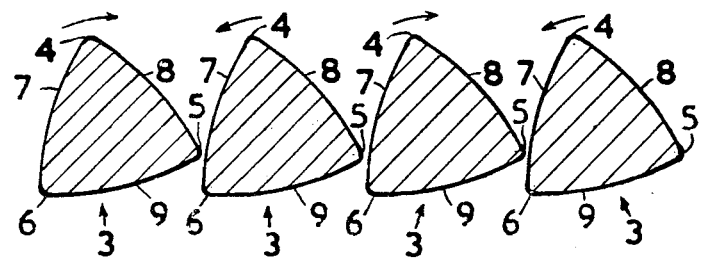

United States Patent Office 2,805,924
Patented Sept. 10, 1957

2,805,924
PRODUCTION OF VISCOSE

John O. Smith and William R. Weigham, Coventry, England, assignors to Courtaulds Limited, London, England, a British company Application September 29, 1953, Serial No. 383,024

Claims priority, application Great Britain November 27, 1952

3 Claims. (Cl. 23—283)

This invention relates to apparatus for use in the production of viscose and more particularly to apparatus for ageing alkali cellulose.

In the normal viscose process cellulose in the form of sheets or slurry is steeped in caustic soda solution, excess caustic soda is removed and the alkali cellulose obtained is reduced to "crumbs" form. The alkali cellulose crumbs are usually aged and are then treated with carbon disulphide to form cellulose xanthate which is dissolved in dilute caustic soda to form viscose.

Continuous processes for the production of viscose have been proposed and United States patent specification No. 2,490,097 describes a process and apparatus for the continuous handling of alkali cellulose through the ripening or ageing step. In this process alkali cellulose in "crumbs" form is continuously spread uniformly across the top of a vertical ageing zone of uniform cross-sectional area, maintained at a controlled temperature and is allowed to settle by gravity and is continuously removed uniformly from the bottom by picking. Our copending application, Serial No. 291,668, filed 4th June, 1952, now Patent No. 2,754,181 describes an apparatus for ageing alkali cellulose comprising a silo merceriser having a stationary ageing compartment through which the alkali cellulose crumbs pass vertically downwards, mechanical pickers to remove crumbs continuously or intermittently from the bottom of the compartment and means for cooling the alkali cellulose during, after, or both during and after its removal by the pickers.

In the picking of alkali cellulose crumbs from the bottom of an ageing compartment it has been found that there are two conditions which should be avoided if possible. If the alkali cellulose crumbs are compressed during the picking this compression will affect subsequent treatments and if, as is likely, the degree of compression differs from crumb to crumb the uniformity of the product will be affected. On the other hand if, in order to avoid compression of the crumbs, the pickers are spaced too far apart, control over the time of ageing and rate of travel of the crumbs through the ageing compartment is lost and some of the crumbs will pass through the ageing compartment too rapidly. For example with widely spaced cylindrical picking rollers having non-intermeshing blades the alkali cellulose crumbs vertically above the clearance gap may pass through the gap under gravity leaving a hollow "chimney" extending vertically upwards from the gap.

The object of the present invention is to eliminate or minimise compression of alkali cellulose crumbs during picking from the bottom of the ageing compartment without losing control over the time of ageing.

According to the present invention an apparatus for ageing alkali cellulose comprises a silo merceriser having a stationary ageing compartment through which the alkali cellulose crumbs pass vertically downwards and mechanical pickers to remove crumbs continuously or intermittently from the bottom of the compartment wherein the pickers comprise rotatable members of non-circular cross-section extending across the full width of the silo merceriser having a substantially uniform clearance and substantially no permanent straight vertical path between adjacent pickers during rotation.

In this specification the expression "no permanent straight vertical path" denotes that, during rotation of the pickers, the path between adjacent pickers oscillates transversely and while remaining substantially uniform in width is not constant in position.

The rotatable picker members may, if desired, be hollow and provided with means for passing a cooling fluid through them.

Preferably the picker members are prismatic having the cross-section of an equilateral triangle with straight or slightly curved sides and rounded apices.

Figure 2:
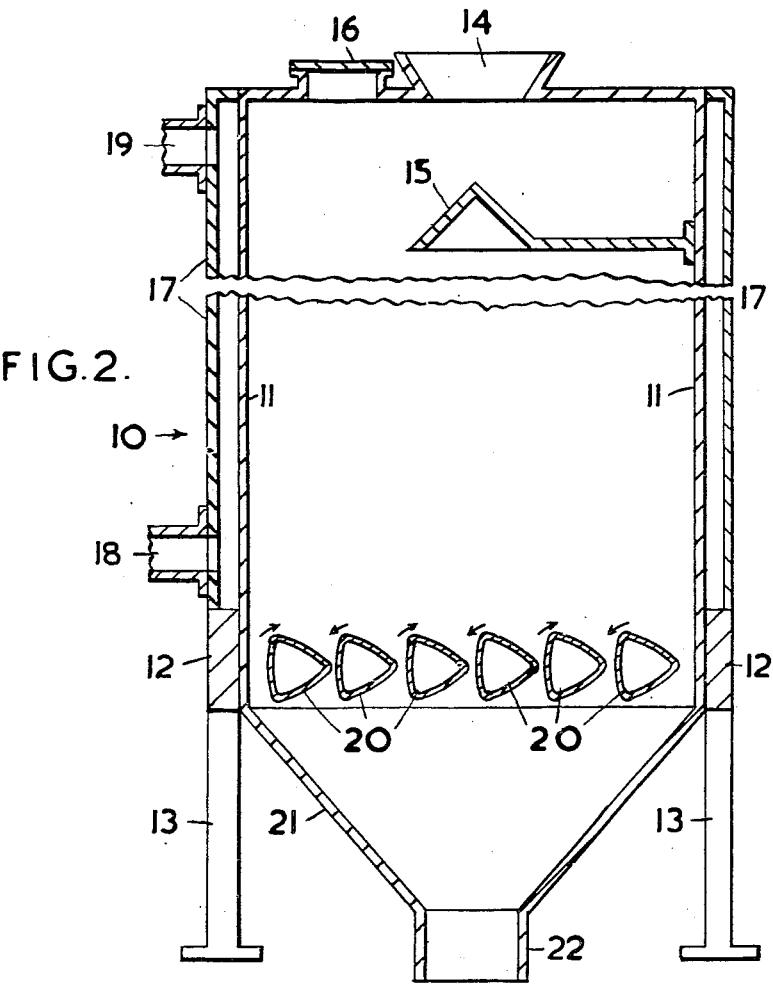

The invention is further described by way of example with reference to the accompanying drawings in which Figure 1 shows, in cross-section, a series of pickers in accordance with the present invention, and Figure 2 shows, in cross-section, a series of pickers in position in an apparatus for ageing alkali cellulose.

Referring to Figure 1 four pickers 3 are shown forming a series. Each picker 3 is generally prismatic in shape with the cross-section of an equilateral triangle with rounded apices 4, 5, 6 and slightly outwardly convex sides 7, 8, 9. If the pickers are rotated at equal speeds in the directions shown by the arrows there will always be a substantially uniform clearance between adjacent pickers but the path between adjacent pickers will continuously change its position, oscillating horizontally. When a series of such pickers is placed at the bottom of an ageing compartment containing alkali cellulose crumbs, and rotated in the directions shown by the arrows the crumbs are prevented from passing between the pickers under gravity and crumbs picked from the base of the alkali cellulose are fed through the pickers substantially without compression. The clearance between these pickers 3 varies over such narrow limits that it can be considered as substantially constant for all practical purposes. The pickers 3 are shown as being solid, but if desired they may be hollow and cooling fluid may be circulated through them in a manner similar to that described in our Patent No. 2,754,181.

Figure 2 shows a series of pickers in position in an apparatus for ageing alkali cellulose. A silo merceriser 10 has an ageing compartment 11 supported in a main frame 12 mounted on supports 13. The compartment 11 has a supply hopper 14 for feeding in alkali cellulose, a cone distributor 15, an inspection cover 16 and a heat insulating jacket 17 through which a heating or cooling fluid may be passed to control the temperature of the outer layers as required by means of an inlet pipe 18 and an outlet pipe 19. At the bottom of the compartment 11 are a number of hollow mechanical pickers 20 of the shape shown in Figure 1. The pickers 20 are mounted and rotated in the directions shown by the arrows by any convenient means such as is described in United States patent specification No. 2,490,097 or in our Patent No. 2,754,181. Cooling fluid may be circulated through the pickers 20 if desired. Below the pickers 20 is a discharge hopper 21 having an outlet 22.

In operation alkali cellulose is supplied continuously to the compartment 11 through the supply hopper 14 and is distributed uniformly over the compartment by the cone distributer 15. The alkali cellulose passes slowly down the compartment 11 and is maintained at a constant temperature by the fluid in jacket 17. The alkali cellulose ages during its passage through the chamber and is discharged from the compartment 11 without compression by the rotating picker members 20.

The alkali cellulose crumbs picked from the alkali cellulose in the compartment 11 pass into the discharge hopper 21 and through the outlet 22 to a xanthating churn or to a cooling drum which may be additional to or in place of the cooling means provided by the circulation of cooling fluid through hollow picker rollers. If the number of rollers is even and the rotation is as shown in Figure 2 alkali cellulose crumbs will not normally pass between the rollers 20 and the sides of the compartment 11 and the possibility of compression there will be considerably reduced or avoided altogether.

What we claim is:

1. Apparatus for ageing alkali cellulose comprising in combination, a stationary ageing compartment through which the alkali cellulose crumbs pass vertically downwards, and a plurality of rotatable mechanical picker elements to remove crumbs from the bottom of the compartment, each pair of said picker elements being hollow and provided with means for passing a cooling fluid therethrough, said picker elements being of uniform, non-circular cross-section across the full width of the compartment, the cross-section of said picker elements being such as to provide that the peripheral surfaces of adjacent elements have at all times during rotation substantially uniform clearance between them defining paths for said crumbs and such as to cause said paths to move horizontally to and fro with reference to a vertical reference plane parallel to the axes of said picker elements as said elements rotate at a uniform speed whereby there is substantially no permanent, straight, vertical path between adjacent picker elements through which crumbs can pass uncontrolled.

2. Apparatus as claimed in claim 1 wherein the picker elements have the cross-section of an equilateral triangle with slightly outwardly convex sides and rounded apices.

3. Apparatus as claimed in claim 1 wherein the picker elements are prismatic and have the cross-section of an equilateral triangle with slightly outwardly convex sides and rounded apices.

References Cited in the file of this patent

UNITED STATES PATENTS

| | | |
|---|---|---|
| 1,637,216 | Cunningham et al. | July 26, 1927 |
| 2,211,270 | James et al. | Aug. 13, 1940 |
| 2,490,097 | Seaman et al. | Dec. 6, 1949 |
| 2,754,181 | Smith et al. | July 10, 1956 |